US00RE46940E

(19) United States
(12) Reissued Patent
Tompkin et al.

(10) Patent Number: US RE46,940 E
(45) Date of Reissued Patent: Jul. 10, 2018

(54) SPEAKERPHONE

(71) Applicant: Polycom, Inc., San Jose, CA (US)

(72) Inventors: Crispian Tompkin, Los Angeles, CA (US); Luke David Springer, El Segundo, CA (US); Anthony Martin Duys, Merrimac, MA (US); Alexander Baker Ekrut, Austin, TX (US)

(73) Assignee: Polycom, Inc., San Jose, CA (US)

(21) Appl. No.: 29/620,772

(22) Filed: May 31, 2017

Related U.S. Patent Documents

Reissue of:
(64) Patent No.: Des. 760,201
Issued: Jun. 28, 2016
Appl. No.: 29/518,227
Filed: Feb. 20, 2015

(51) LOC (11) Cl. ..... 14-01
(52) U.S. Cl.
USPC ..... D14/221
(58) Field of Classification Search
USPC ..... D14/149, 150, 155, 159, 215, 217, 218, D14/221, 225, 229, 240, 299; D13/108; D21/331

(Continued)

(56) References Cited

U.S. PATENT DOCUMENTS 4,363,482 A 12/1982 Goldfarb
D283,124 S * 3/1986 Kolb ..... D14/210

(Continued)

FOREIGN PATENT DOCUMENTS

TW D108485 8/1994

OTHER PUBLICATIONS

Xing Conference Phone for Skype, <URL: www.ipevo.com>, retrieved from Internet Jan. 31, 2008.

(Continued)

*Primary Examiner* — Phillip S Hyder
(74) *Attorney, Agent, or Firm* — Blank Rome, LLP

(57) CLAIM

The ornamental design for a speakerphone, as shown and described.

DESCRIPTION

*This application is an application for reissue of U.S. Design Pat. No. D760,201 which issued on Jun. 18, 2016, from U.S. Design application Ser. No. 29/518,227, filed Feb. 20, 2015, the contents of which are entirely incorporated by reference herein.*

FIG. 1 is a perspective view showing a top, a front, and [a] *the* left side of a *first embodiment of a* speakerphone according to our new design;

FIG. 2 is [an] *a front* elevational view [of the front of the speakerphone] *thereof*;

FIG. 3 is [an] *a rear* elevational view [of a back of the speakerphone] *thereof*;

FIG. 4 is [an] *a left side* elevational view [of the left side of the speakerphone] *thereof*;

FIG. 5 is [an] *a right side* elevational view [of a right side of the speakerphone; and] *thereof;*

FIG. 6 is a *top* plan view [of the top of the speakerphone; and,] *thereof;*

FIG. 7 is a *bottom* plan view [of a bottom of the speakerphone.] *thereof;*

*FIG. 8 is a perspective view showing a top, front and the left side of a second embodiment of a speakerphone according to our new design;*

*FIG. 9 is a front elevational view thereof;*

*FIG. 10 is a rear elevational view thereof;*

*FIG. 11 is a left side elevational view thereof;*

*FIG. 12 is a right side elevational view thereof;*

*FIG. 13 is a top plan view thereof; and,*

*FIG. 14 is a bottom plan view thereof.*

The broken lines showing in FIGS. [1-5 and 7] *1-14* are for illustrative purposes only and form no part of the claimed design.

(Continued)

(Amended)

The grid of circular apertures schematically depicted in FIGS. [1-6] *8-9 and 13* is continuous throughout the surfaces on which the apertures are shown.

1 Claim, 8 Drawing Sheets

Matter enclosed in heavy brackets [ ] appears in the original patent but forms no part of this reissue; matter printed in italics indicates the additions made by reissue.

(58) Field of Classification Search
CPC . H04M 3/42; H04M 1/20; H04M 1/22; H04R 1/02; H04R 3/00; H04R 1/28
See application file for complete search history.

(56) References Cited

U.S. PATENT DOCUMENTS

| | | | | | |
|---|---|---|---|---|---|
| D292,090 | S | * | 9/1987 | Shintomi | D14/141.1 |
| D292,283 | S | * | 10/1987 | Matsuda | D14/212 |
| D303,522 | S | * | 9/1989 | Meda | D14/142 |
| 4,875,234 | A | * | 10/1989 | Tragatschnig | H04M 1/02 379/368 |
| D308,701 | S | | 6/1990 | Kojima | |
| D309,161 | S | | 7/1990 | Leung | |
| D311,541 | S | | 10/1990 | Carre | |
| D327,479 | S | | 6/1992 | Britz | |
| D332,948 | S | * | 2/1993 | Barr | D14/392 |
| D342,732 | S | | 12/1993 | Hinman et al. | |
| D368,721 | S | | 4/1996 | Howell et al. | |
| D375,090 | S | | 10/1996 | Lambert et al. | |
| D382,265 | S | | 8/1997 | Wakefield | |
| D382,266 | S | | 8/1997 | Wakefield | |
| D396,716 | S | | 8/1998 | Matsuda et al. | |
| D403,328 | S | * | 12/1998 | Wakefield | D14/229 |
| D406,841 | S | | 3/1999 | Myung | |
| D411,995 | S | | 7/1999 | Chen | |
| 6,016,346 | A | | 1/2000 | Rittmueller et al. | |
| D419,997 | S | | 2/2000 | Montalbo et al. | |
| D421,606 | S | | 3/2000 | Montalbo et al. | |
| D431,236 | S | | 9/2000 | Read et al. | |
| D434,747 | S | | 12/2000 | Bird et al. | |
| D439,538 | S | | 3/2001 | Lynch | |
| D444,777 | S | | 7/2001 | Bird et al. | |
| D448,754 | S | | 10/2001 | Chang | |
| D449,285 | S | | 10/2001 | Wakefield et al. | |
| D449,286 | S | | 10/2001 | Wakefield et al. | |
| D457,150 | S | | 5/2002 | Chen | |
| D461,179 | S | | 8/2002 | Christianson | |
| D463,410 | S | | 9/2002 | Strand et al. | |
| D473,546 | S | | 4/2003 | Hovanky et al. | |
| D474,169 | S | | 5/2003 | Fletcher | |
| D478,560 | S | | 8/2003 | Misrahi et al. | |
| D480,059 | S | | 9/2003 | Misrahi et al. | |
| D481,371 | S | | 10/2003 | Chen | |
| D488,794 | S | | 4/2004 | Chen | |
| D489,358 | S | * | 5/2004 | Chen | D14/215 |
| D491,909 | S | | 6/2004 | Sun | |
| D499,392 | S | | 12/2004 | Bathurst et al. | |
| D536,327 | S | | 2/2007 | Lukic et al. | |
| D556,179 | S | | 11/2007 | Chang | |
| D557,675 | S | | 12/2007 | Diebel et al. | |
| D557,676 | S | | 12/2007 | Suzuki et al. | |
| D566,682 | S | | 4/2008 | Marash | |
| D571,776 | S | * | 6/2008 | Duys | D14/150 |
| D576,156 | S | | 9/2008 | Wilson et al. | |
| D579,911 | S | * | 11/2008 | Wei | D14/155 |
| 7,480,502 | B2 | * | 1/2009 | Biddulph | H01Q 1/38 343/833 |
| D586,743 | S | * | 2/2009 | Guccione | D13/107 |
| D594,438 | S | | 6/2009 | Wada | |
| D620,916 | S | * | 8/2010 | Wada | D14/149 |
| D635,955 | S | * | 4/2011 | Corrigan | D14/149 |
| D674,338 | S | | 1/2013 | Au Yeung | |
| D674,374 | S | | 1/2013 | Roberts | |
| D714,258 | S | * | 9/2014 | Montague | D14/221 |
| 2003/0053620 | A1 | | 3/2003 | Chen | |
| 2009/0268899 | A1 | * | 10/2009 | Tokuda | H04M 1/6033 379/420.02 |

OTHER PUBLICATIONS

Polycom VoiceStation 300, <URL: www.101Phones.com>, retrieved from Internet Jan. 31, 2008.

Polycom SoundStation2, <URL: www.101Phones.com>, retrieved from internet Jan. 31, 2008.

* cited by examiner

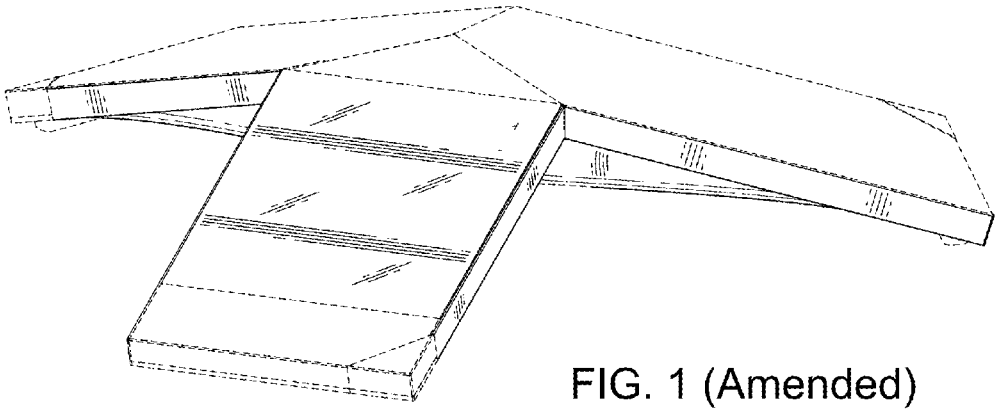
FIG. 1 (Amended)
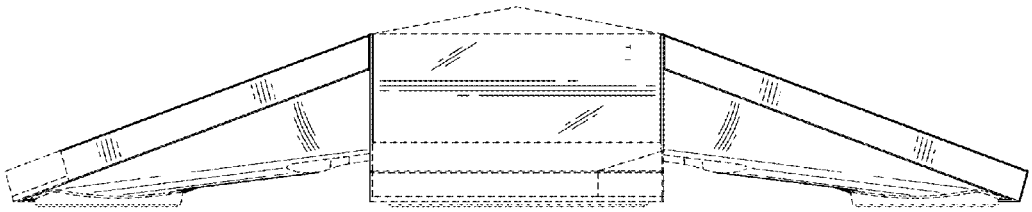
FIG. 2 (Amended)

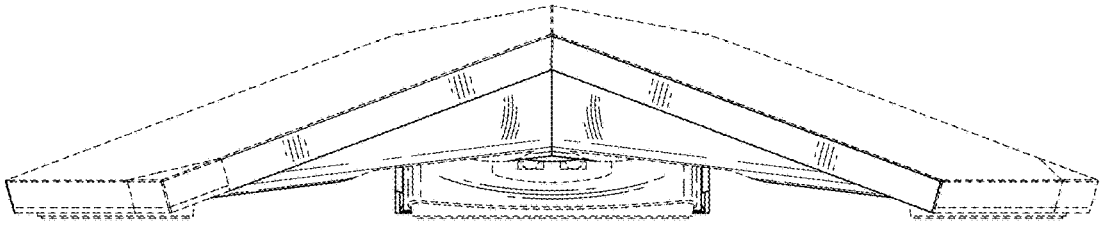
FIG. 3 (Amended)
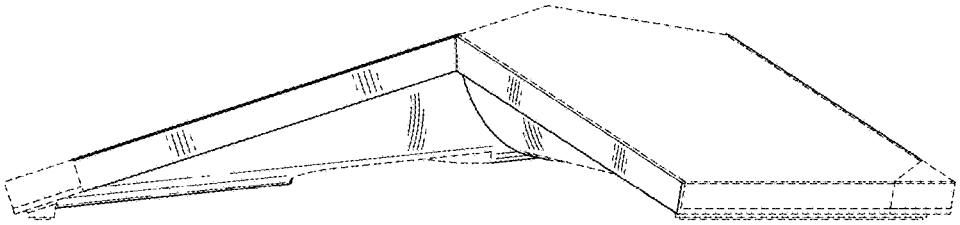
FIG. 4 (Amended)
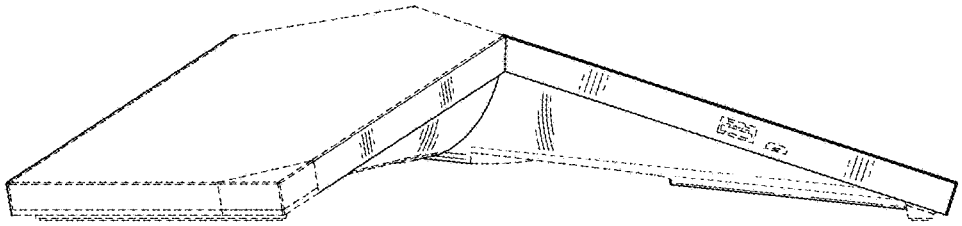
FIG. 5 (Amended)

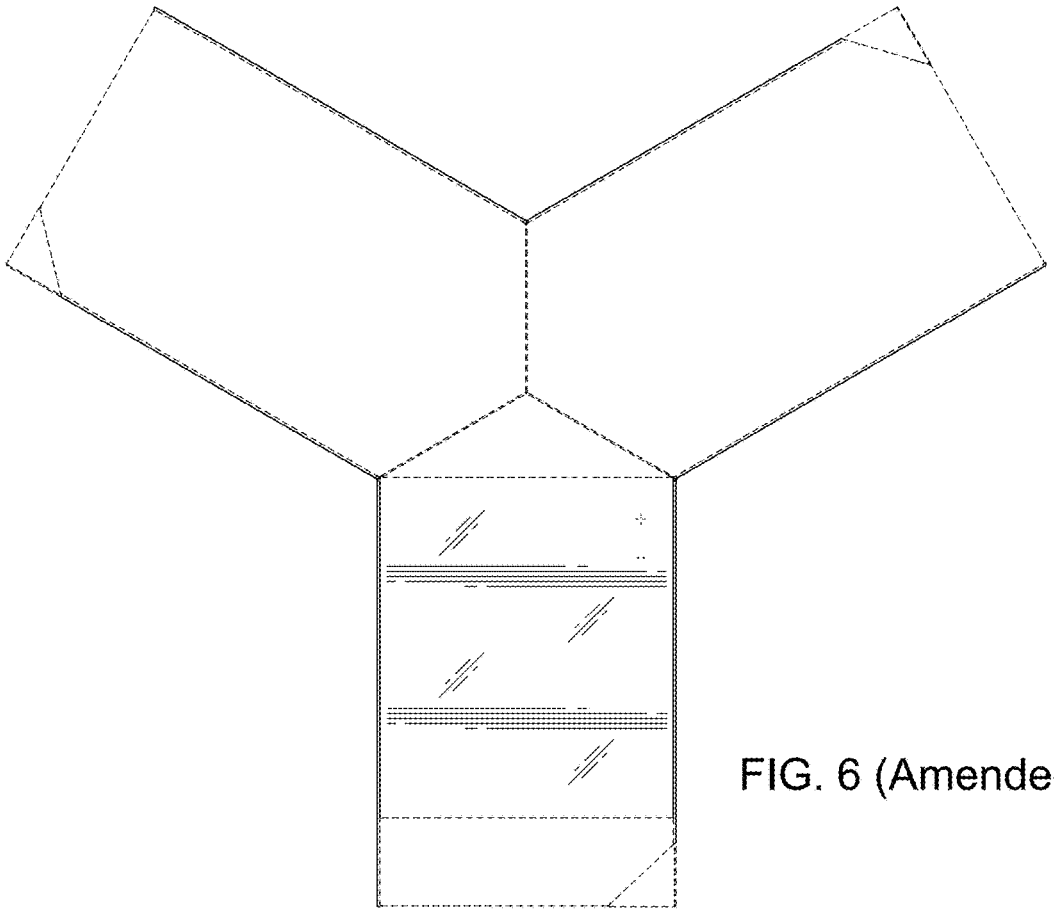
FIG. 6 (Amended)

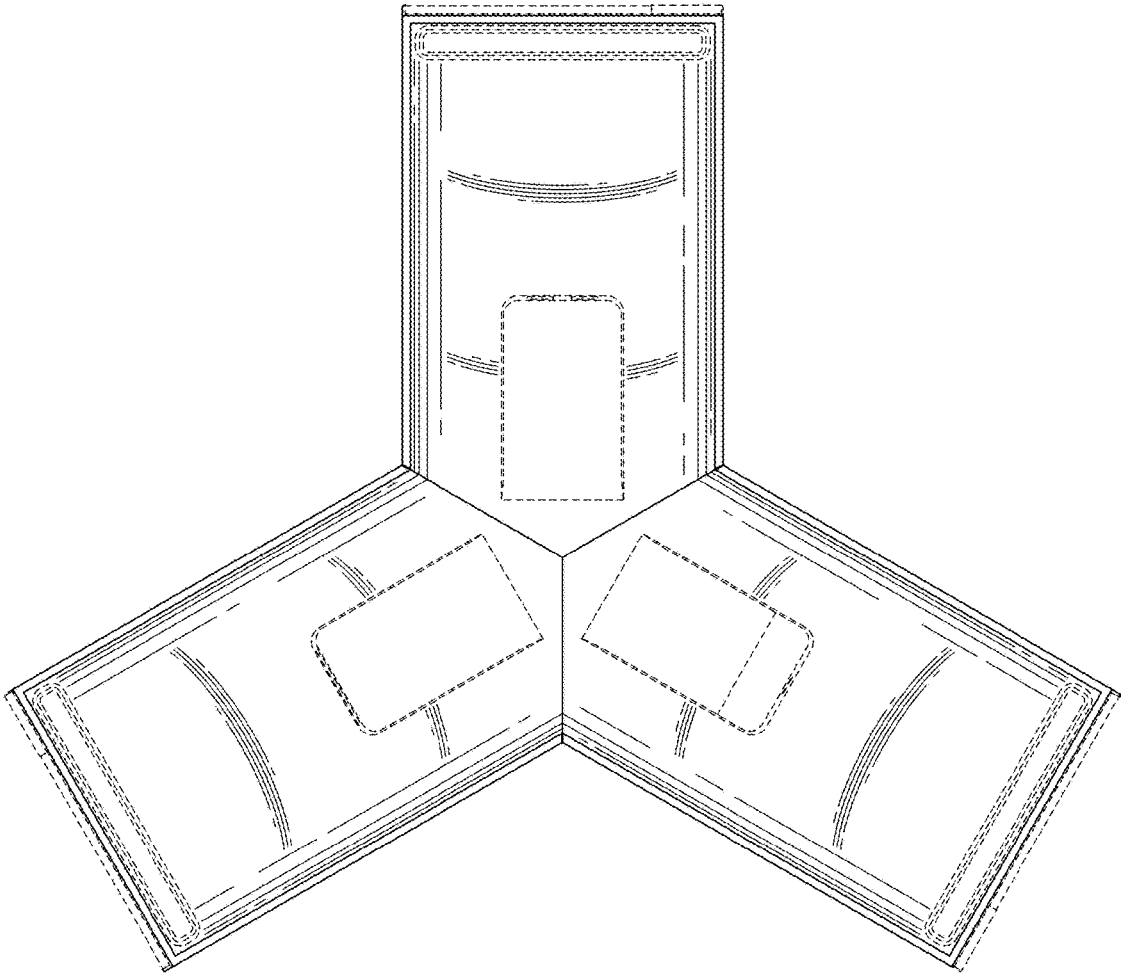
FIG. 7 (Amended)

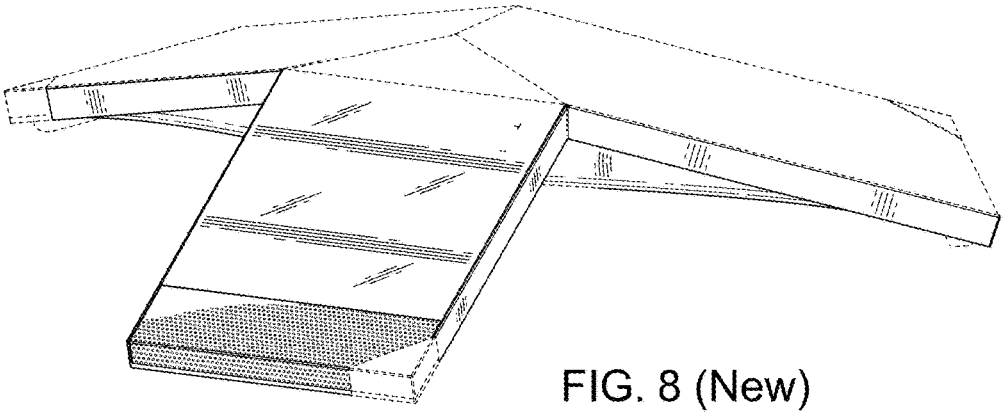
FIG. 8 (New)
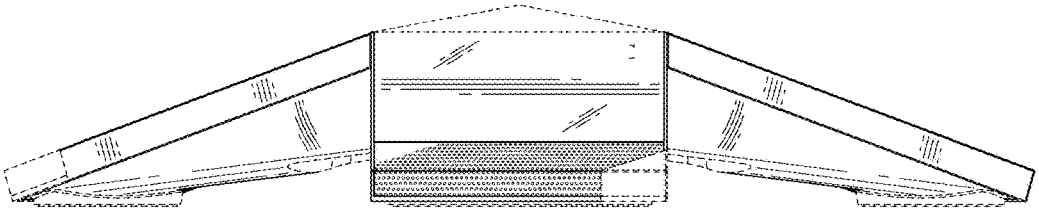
FIG. 9 (New)

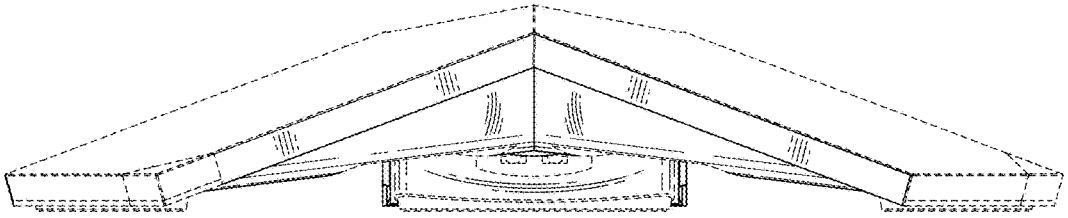
FIG. 10 (New)
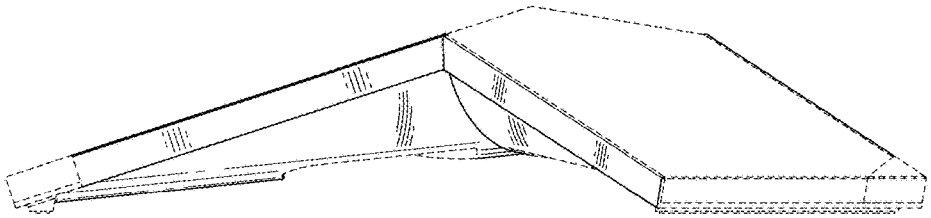
FIG. 11 (New)
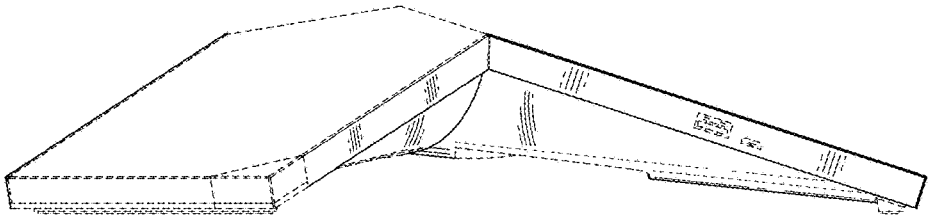
FIG. 12 (New)

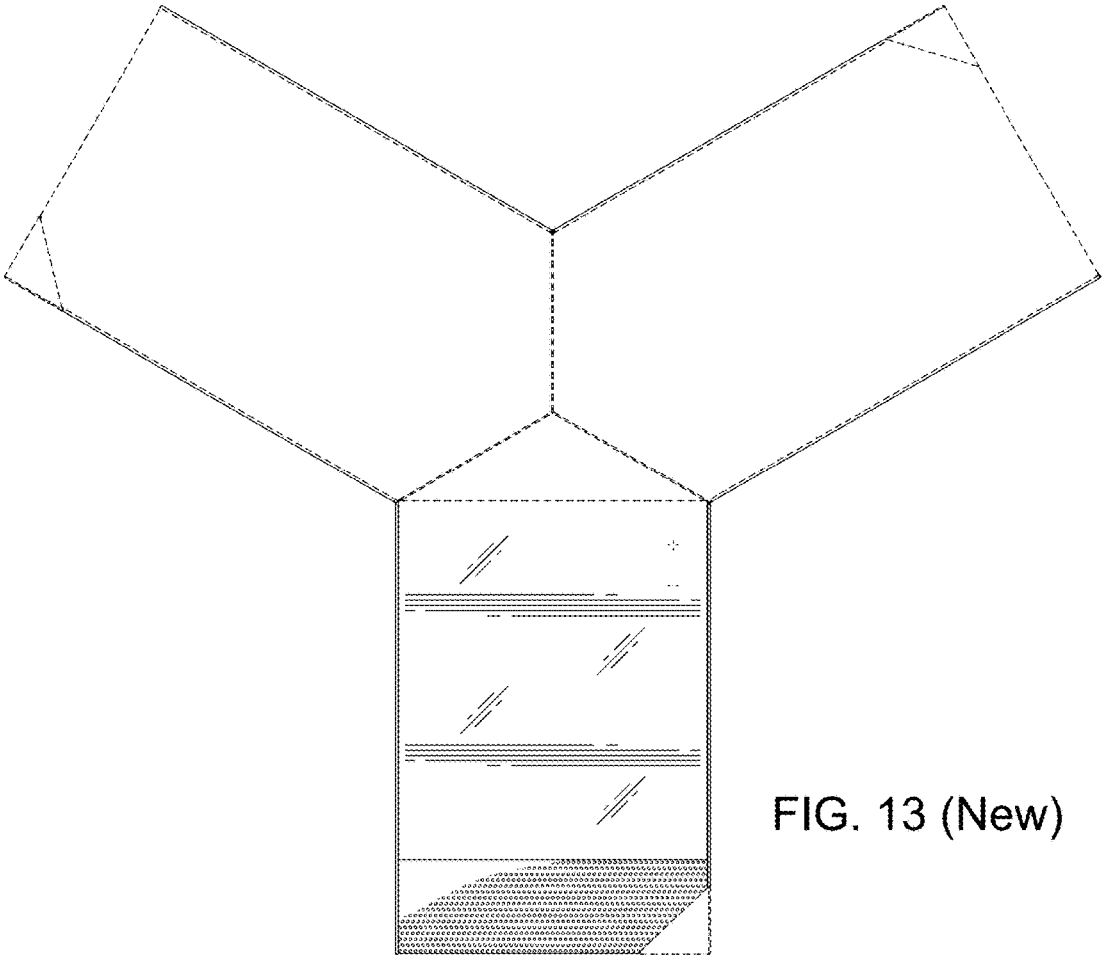
FIG. 13 (New)

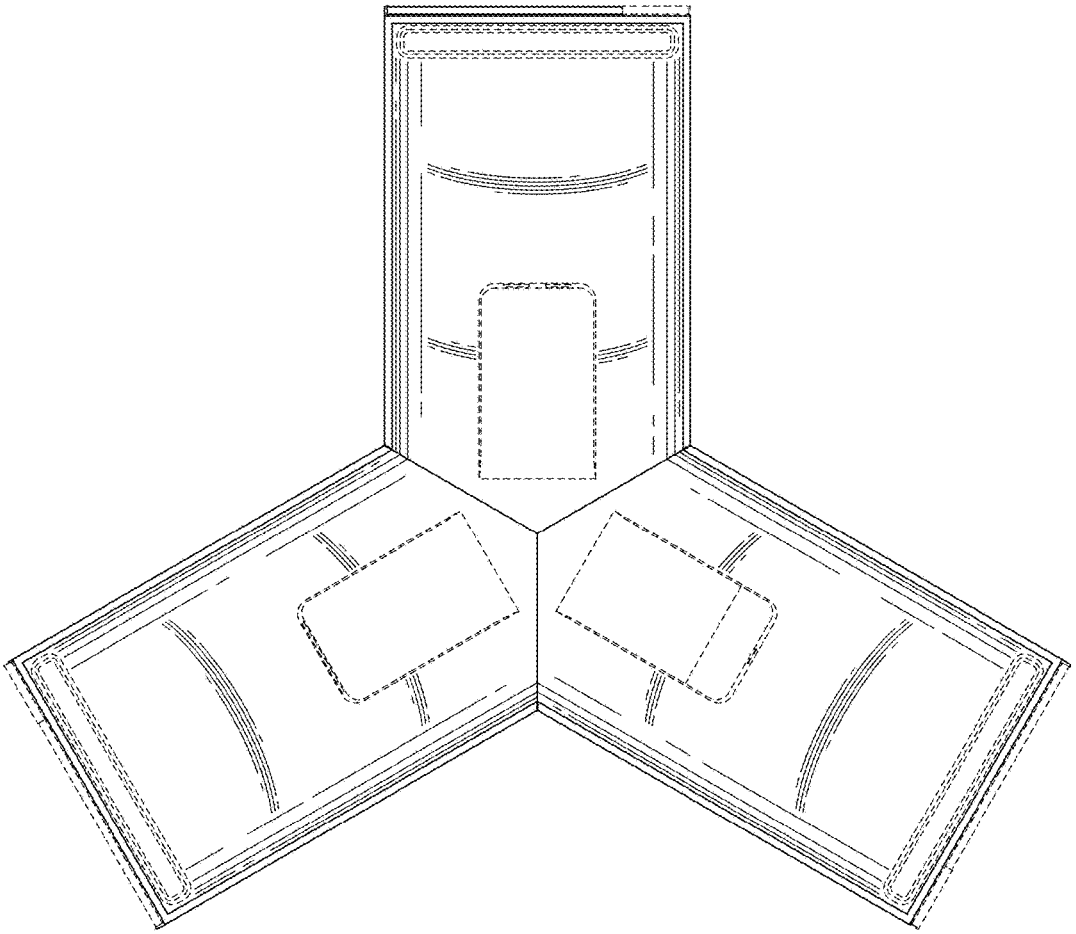
FIG. 14 (New)